United States Patent
Tanaka

(10) Patent No.: US 9,835,646 B2
(45) Date of Patent: Dec. 5, 2017

(54) FUNCTIONAL DEVICE, ELECTRONIC APPARATUS, AND MOVING OBJECT

(71) Applicant: Seiko Epson Corporation, Tokyo (JP)

(72) Inventor: Satoru Tanaka, Chino (JP)

(73) Assignee: Seiko Epson Corporation (JP)

( * ) Notice: Subject to any disclaimer, the term of this patent is extended or adjusted under 35 U.S.C. 154(b) by 392 days.

(21) Appl. No.: 14/338,910

(22) Filed: Jul. 23, 2014

(65) Prior Publication Data

US 2015/0029690 A1  Jan. 29, 2015

(30) Foreign Application Priority Data

Jul. 24, 2013 (JP) ................... 2013-153323

(51) Int. Cl.
*H05K 7/00* (2006.01)
*G01P 15/125* (2006.01)

(52) U.S. Cl.
CPC .................. *G01P 15/125* (2013.01)

(58) Field of Classification Search
CPC ..... B81B 7/02; B81B 7/0074; G01C 19/5719; H05K 1/0231; H05K 1/141–1/144
USPC ....... 361/760–764, 782–784; 73/493–504.12
See application file for complete search history.

(56) References Cited

U.S. PATENT DOCUMENTS

| | | | |
|---|---|---|---|
| 5,987,989 A * | 11/1999 | Yamamoto | B81B 7/0006 361/280 |
| 6,240,782 B1 | 6/2001 | Kato et al. | |
| 6,450,031 B1 * | 9/2002 | Sakai | B81B 3/0086 73/514.16 |
| 6,568,267 B2 | 5/2003 | Chida et al. | |
| 6,763,716 B2 * | 7/2004 | Nagahara | B81B 7/0006 73/493 |
| 8,220,330 B2 * | 7/2012 | Miller | B81B 7/02 73/493 |
| 2009/0031809 A1 * | 2/2009 | Lin | G01P 15/125 73/514.32 |
| 2009/0205421 A1 * | 8/2009 | Naruse | G01C 19/5607 73/504.12 |
| 2009/0241662 A1 * | 10/2009 | Supino | G01C 19/5719 73/504.12 |
| 2010/0242600 A1 * | 9/2010 | Lin | B81B 7/0074 73/504.12 |
| 2011/0291644 A1 * | 12/2011 | Kanemoto | G01P 15/0802 324/162 |

(Continued)

FOREIGN PATENT DOCUMENTS

| | | |
|---|---|---|
| JP | 2001-330442 A | 11/2001 |
| JP | 2007-279056 A | 10/2007 |

(Continued)

*Primary Examiner* — Tuan T Dinh
(74) *Attorney, Agent, or Firm* — Harness, Dickey & Pierce, P.L.C.

(57) ABSTRACT

A functional device includes a fixed electrode portion including a first fixed electrode portion and a second fixed electrode portion, a first wiring portion connected to the first fixed electrode portion, and a second wiring portion connected to the second fixed electrode portion. At least one of the first wiring portion and the second wiring portion is provided with a branch portion. One wiring line extending from the branch portion is connected to the fixed electrode portion, and another wiring line extending from the branch portion is provided along the first wiring portion or the second wiring portion.

12 Claims, 9 Drawing Sheets

(56) References Cited

U.S. PATENT DOCUMENTS

| | | | |
|---|---|---|---|
| 2012/0111615 A1 | 5/2012 | Yoda et al. | |
| 2012/0267150 A1 | 10/2012 | Yoda et al. | |
| 2013/0042685 A1* | 2/2013 | Yoda | G01P 15/0802 |
| | | | 73/514.16 |
| 2013/0126987 A1* | 5/2013 | Uto | B81C 1/00269 |
| | | | 257/414 |

FOREIGN PATENT DOCUMENTS

| | | |
|---|---|---|
| JP | 2012-098208 A | 5/2012 |
| JP | 2012-141160 A | 7/2012 |
| JP | 2012-225803 A | 11/2012 |
| JP | 2012-247204 A | 12/2012 |

\* cited by examiner

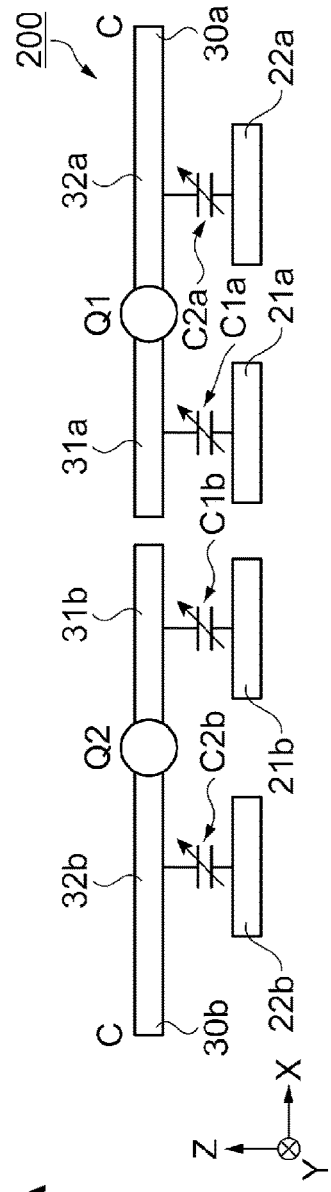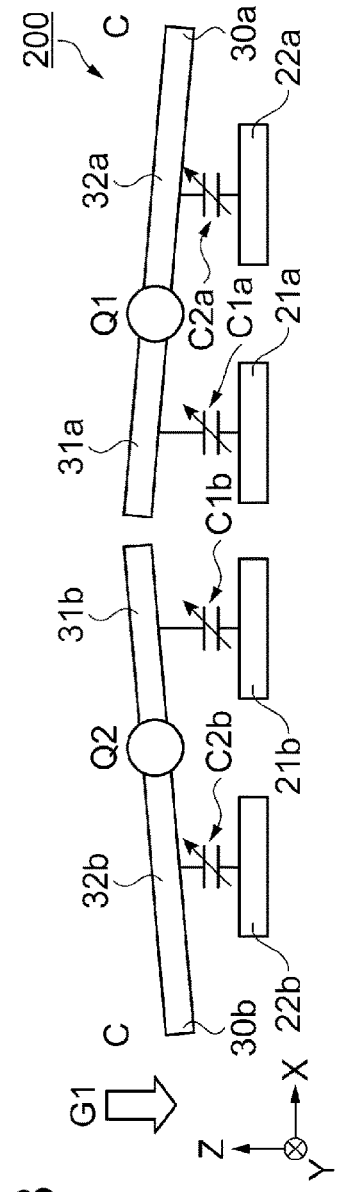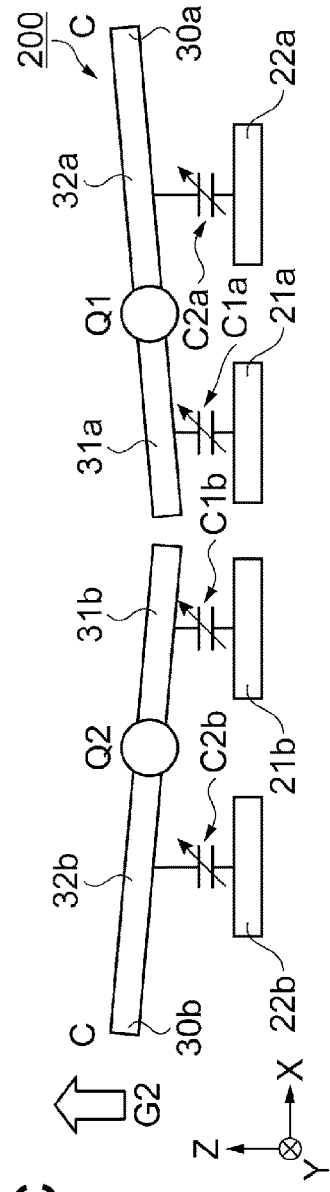

FUNCTIONAL DEVICE, ELECTRONIC APPARATUS, AND MOVING OBJECT

CROSS-REFERENCE TO RELATED APPLICATIONS

This application claims priority to Japanese Patent Application No. 2013-153323 filed on Jul. 24, 2013. The entire disclosure of Japanese Patent Application No. 2013-153323 is hereby incorporated herein by reference.

BACKGROUND

1. Technical Field

The present invention relates to a functional device, an electronic apparatus, and a moving object.

2. Related Art

As a device in a physical quantity sensor that is used as a functional device and detects a physical quantity, such as acceleration, there is a known device of related art in which a plurality of wiring lines through which electric signals of the same type are allowed to pass are configured to have the same electric characteristics. In a disclosed physical quantity sensor including such a device, the same electric characteristics are achieved by configuring drive wiring lines or detection wiring lines to have the same length and width and arranging the wiring lines in a symmetric manner (see JP-A-2001-330442, for example).

In the device in the physical quantity sensor described above, however, the same electric characteristics are achieved by configuring drive wiring lines or detection wiring lines to have the same length and width and arranging the wiring lines in a symmetric manner. Since the wiring lines (drive wiring lines or detection wiring lines) in the device in the physical quantity sensor are disposed with a spacing therebetween, the wiring lines show differences in the amount of noise produced when disturbance (such as electrostatic noise) enters the wiring lines. In the device in the physical quantity sensor of the related art, the differences in the amount of noise may cause inaccuracy in detection sensitivity.

SUMMARY

An advantage of some aspects of the invention is to solve at least a part of the problems described above, and the invention can be implemented as the following forms or application examples.

Application Example 1

This application example is directed to a functional device including a fixed electrode portion including a first fixed electrode portion and a second fixed electrode portion, a first wiring portion connected to the first fixed electrode portion, and a second wiring portion connected to the second fixed electrode portion. At least one of the first wiring portion and the second wiring portion is provided with a branch portion. One wiring line extending from the branch portion is connected to the fixed electrode portion, and another wiring line extending from the branch portion is provided along the first wiring portion or the second wiring portion.

According to the functional device of this application example, when a physical quantity is applied to the functional device, each of the gap between the movable body and the first fixed electrode portion and the gap between the movable body and the second fixed electrode portion changes, and electrostatic capacitance according to the physical quantity is created. The electrostatic capacitance created between the movable body and the first fixed electrode portion can be extracted through the first wiring portion. Similarly, the electrostatic capacitance created between the movable body and the second fixed electrode portion can be extracted through the second wiring portion.

At least one of the first wiring portion and the second wiring portion is provided a branch portion, and one wiring line extending from the branch portion is connected to the first fixed electrode portion or the second fixed electrode portion. Another wiring line extending from the branch portion is disposed along the first wiring portion or the second wiring portion in parallel and adjacent thereto, whereby disturbance (such as electrostatic noise) that enters the first wiring portion and the disturbance that enters the second wiring portion have substantially the same phase and magnitude. Therefore, even when noise enters the first wiring portion and the second wiring portion, subtracting the output from one of the wiring portions from the output from the other wiring portion allows cancellation of at least a large part of influence of the noise in the electrostatic capacitance values. As a result, even when noise contaminates the electrostatic capacitance values, the noise, which causes inaccuracy in detection sensitivity, in the electrostatic capacitance values can be canceled. Therefore, even when noise enters part of the first wiring portion and the second wiring portion, the subtraction allows an improvement in measurement precision of the functional device.

Further, arranging the first wiring portion and the second wiring portion in an asymmetric manner in a plan view allows part of the first wiring portion and part of the second wiring portion to be so provided that they are adjacent and parallel to each other, whereby the difference in the amount of noise that enters the first wiring portion and the amount of noise that enters the second wiring portion can be further reduced. As a result, subtracting the output from one of the first and second wiring portions from the output from the other wiring portion allows cancellation of at least a large part of the noise, which causes inaccuracy in detection sensitivity, in the electrostatic capacitance values.

The functional device according to this application example therefore has improved detection sensitivity and increased physical quantity measurement precision. This application example is applicable, for example, to a seesaw-type sensor having a flat-plate-shaped movable body, a comb-type sensor having a movable body including a comb-shaped movable electrode portion, and a comb-type MEMS (micro electro mechanical system) resonator.

Application Example 2

This application example is directed to the functional device according to the application example described above, wherein each of the first wiring portion and the second wiring portion has a portion extending in parallel to a first direction, and the portion of the first wiring portion that extends in the first direction and the portion of the second wiring portion that extends in the first direction have the same length.

According to the functional device of this application example, configuring the first wiring portion and the second wiring portion in such a way that portions thereof extending in parallel to each other have the same length allows the amounts of any disturbance noise that enters the first wiring portion and the second wiring portion to be substantially equal to each other, whereby subtracting the output from one of the first and second wiring portions from the output from the other wiring portion or any other type of in-circuit processing of the outputs allows cancellation of the disturbance noise components.

Application Example 3

This application example is directed to the functional device according to the application example described above, which further includes a movable body including a movable electrode portion, and the fixed electrode portion may be disposed in a position where the fixed electrode portion faces the movable electrode portion.

According to the functional device of this application example, a seesaw-type sensor having a flat-plate-shaped movable body can be formed, whereby a sensor device that is less sensitive to disturbance noise than a typical sensor is achieved.

Application Example 4

This application example is directed to the functional device according to the application example described above, wherein the movable body and the fixed electrode portion, which is paired with the movable body, are provided at a plurality of locations.

According to the functional device of this application example, since the movable body and the fixed electrode portion, which is paired with the movable body, are provided at a plurality of locations, the functional device can detect not only electrostatic capacitance according to a physical quantity applied to the movable body in the direction perpendicular thereto but also electrostatic capacitance according to a physical quantity applied to the movable body in a direction that intersects the direction perpendicular to the movable body.

As a result, the functional device can remove the physical quantity applied to the movable body in the direction that intersects the direction perpendicular thereto and measure the physical quantity applied to the movable body in the direction perpendicular thereto with increased precision.

Application Example 5

This application example is directed to the functional device according to the application example described above, wherein a portion of one of the first wiring portion and the second wiring portion intersects a portion of the other one of the first wiring portion and the second wiring portion.

Application Example 6

This application example is directed to the functional device according to the application example described above, wherein at the portions that intersect each other, an insulating member is provided between the first wiring portion and the second wiring portion.

Application Example 7

This application example is directed to the functional device according to the application example described above, wherein at the portions that intersect each other, the first wiring portion is provided in a groove provided in a substrate, and the second wiring portion is so provided that the second wiring portion extends over the groove and intersects the groove.

According to the functional devices of these application examples, configuring part of the first wiring portion and part of the second wiring portion in such a way that these parts are parallel to each other and have substantially the same length requires the first and second wiring portions to have portions that intersect each other in a plan view in the direction perpendicular to the fixed electrode portion. Providing an insulating member at the location where the first wiring portion and the second wiring portion intersect each other to electrically separate them from each other allows the first wiring portion and the second wiring portion to intersect each other.

As a result, when disturbance (such as electrostatic noise) enters the thus configured first and second wiring portions, that is, part of the first wiring portion and part of the second wiring portion have substantially the same electrical characteristics because they are parallel to each other and have substantially the same length, the disturbance that enters the first wiring portion and the disturbance that enters the second wiring portion have substantially the same phase and magnitude. Subtracting the output from one of the first and second wiring portions from the output from the other wiring portion allows cancellation of influence of the noise, which causes inaccuracy in detection sensitivity, in the electrostatic capacitance values, whereby measurement precision of the functional device can be increased.

Application Example 8

This application example is directed to an electronic apparatus including the functional device according to the application example described above incorporated therein.

According to the electronic apparatus of this application example, when the functional device described above is incorporated in the electronic apparatus and used as a physical quantity sensor, the subtraction described above allows cancellation of influence of disturbance (electrostatic noise), which causes detection inaccuracy, whereby the electronic apparatus can measure a physical quantity with high precision. This application example is applicable not only to a physical quantity sensor but also to a comb-type MEMS resonator or any other resonator, and an electronic apparatus having such a resonator incorporated therein can be provided.

Application Example 9

This application example is directed to a moving object including the functional device according to the application example described above incorporated therein.

According to the moving object of this application example, when the functional device described above is incorporated in the moving object and used as a physical quantity sensor, the subtraction described above allows cancellation of influence of disturbance (electrostatic noise), which causes detection inaccuracy, whereby the moving object can measure a physical quantity with high precision. This application example is applicable not only to a physical quantity sensor but also to a comb-type MEMS resonator or any other resonator, and a moving object having such a resonator incorporated therein can be provided.

BRIEF DESCRIPTION OF THE DRAWINGS

The invention will be described with reference to the accompanying drawings, wherein like numbers reference like elements.

FIGS. 7A, 7B, 7C, 7D, and 7E are diagrammatic views showing the action of the physical quantity sensor in a portion taken along the line C-C in FIG. 5.

DESCRIPTION OF EXEMPLARY EMBODIMENTS

Figure 1:
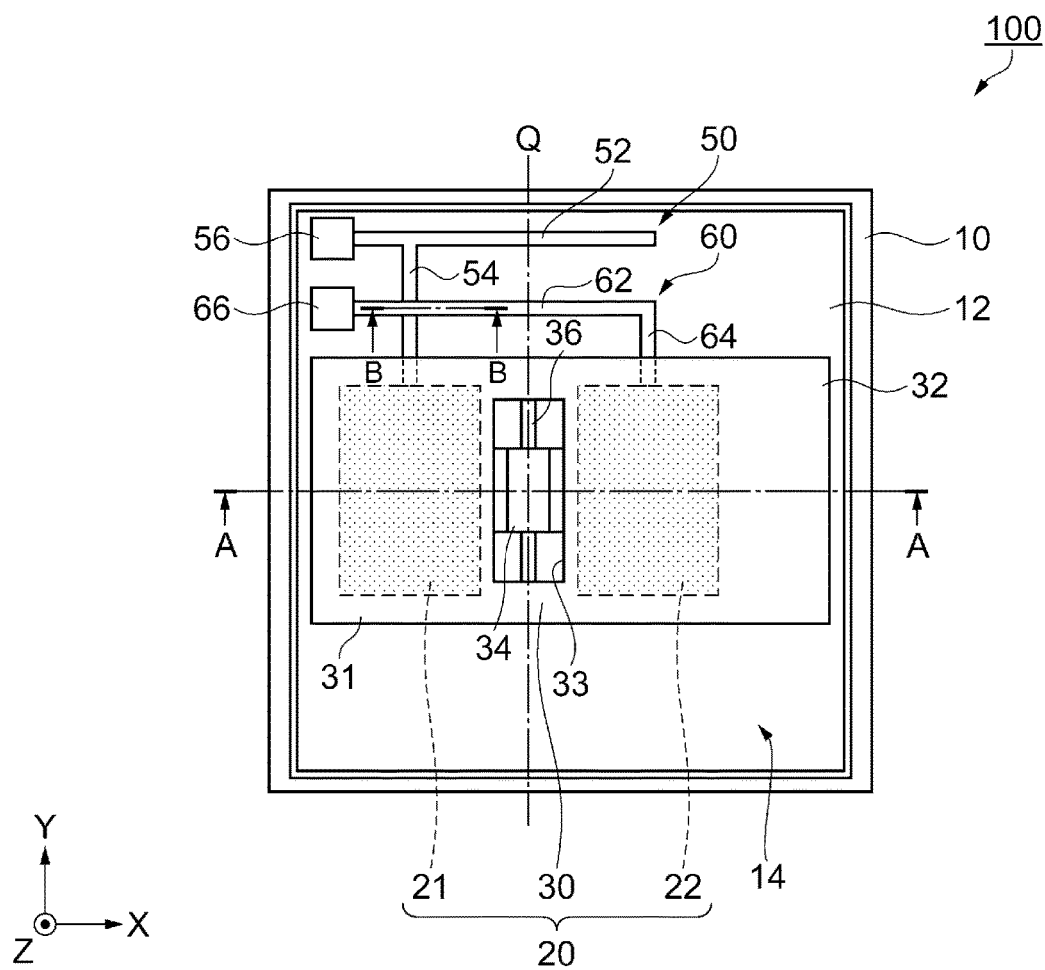
FIG. 1 is a plan view showing the configuration of a physical quantity sensor according to a first embodiment.

Embodiments according to the invention will be described below with reference to the drawings. In the following drawings, the dimension and scale of each component is intentionally differentiated from those of an actual component as appropriate in some cases to enlarge the component to a recognizable size in the drawings.

First Embodiment

A functional device according to a first embodiment will be described with reference to FIG. 1 to FIGS. 4A to 4C based, for example, on a case where the functional device is used as a physical quantity sensor.

Figure 2:
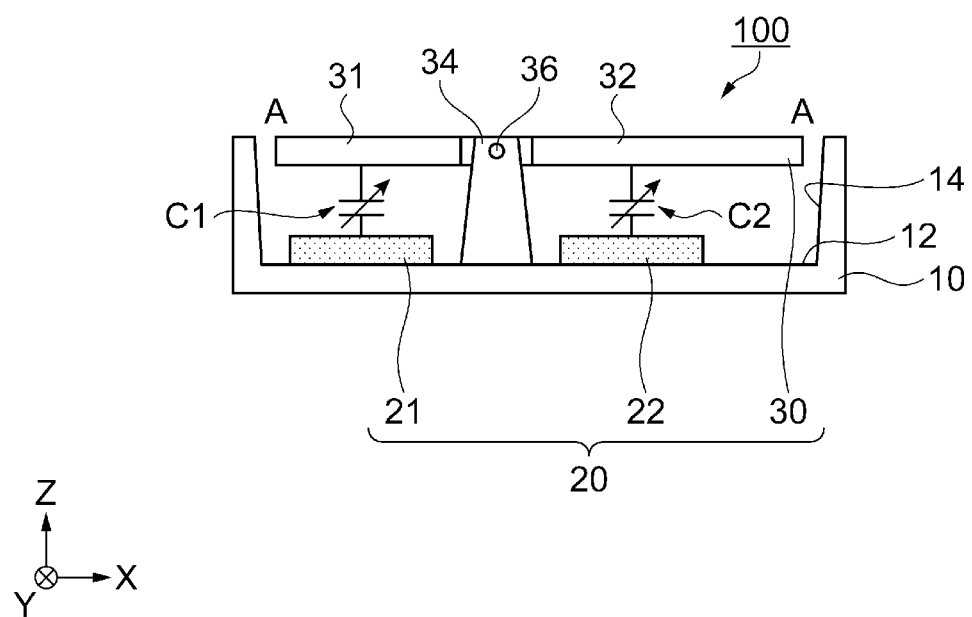
FIG. 2 is a cross-sectional view of the physical quantity sensor taken along the line A-A in FIG. 1.
Figure 3:
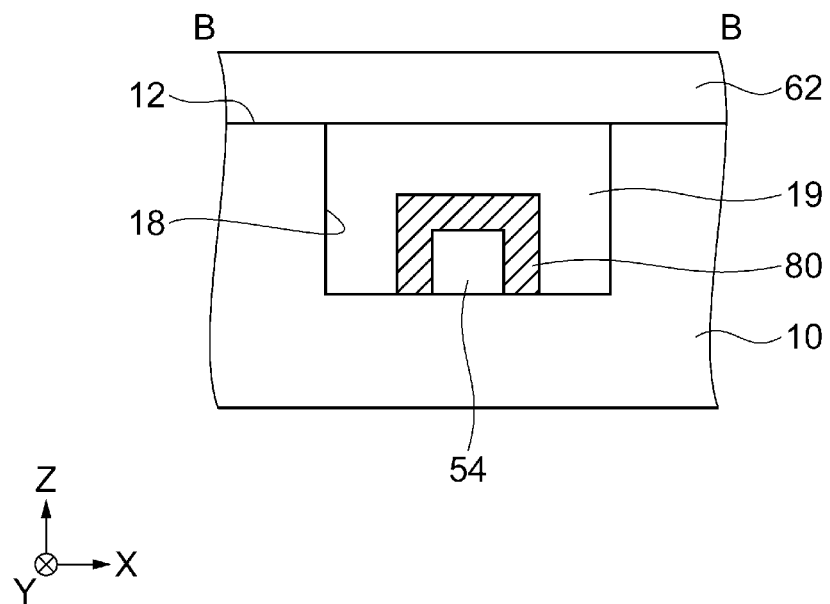
FIG. 3 is a partial cross-sectional view of the physical quantity sensor taken along the line B-B in FIG. 1.
Figure 4A:
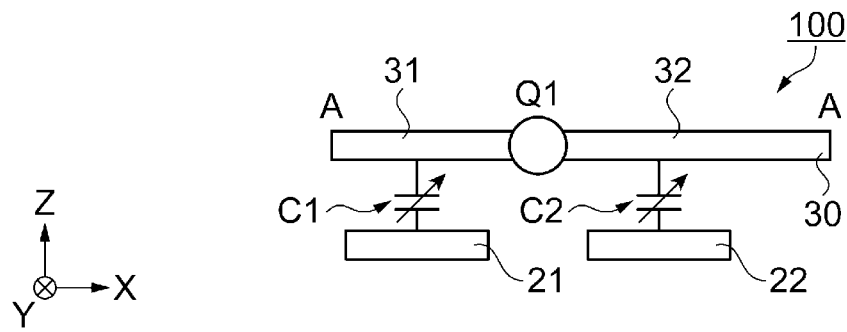
FIGS. 4A, 4B, and 4C are diagrammatic views showing the action of the physical quantity sensor in a portion taken along the line A-A in FIG. 1.
Figure 4B:
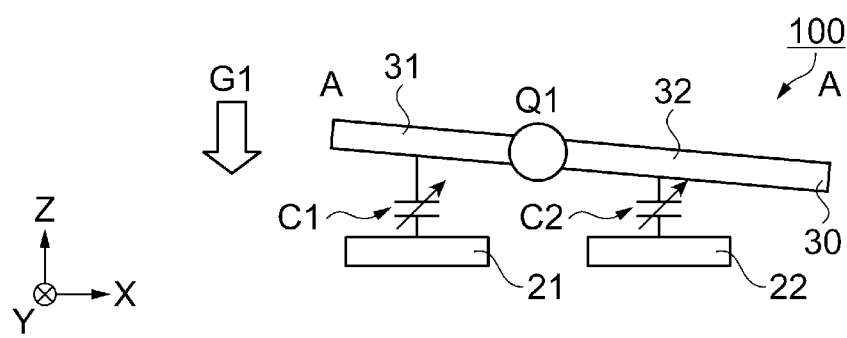
Figure 4C:
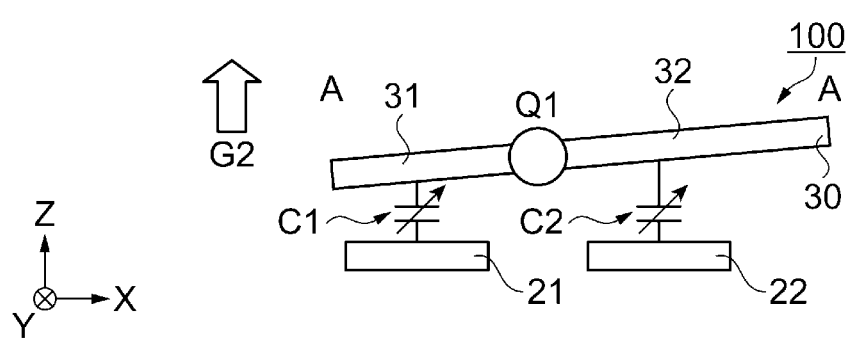

FIG. 1 is a plan view showing the configuration of a physical quantity sensor 100 according to the first embodiment. FIG. 2 is a cross-sectional view showing the configuration of the physical quantity sensor 100 and shows a cross section taken along the line A-A in FIG. 1. FIG. 3 is a partial cross-sectional view showing the configuration of the physical quantity sensor 100 and shows an enlarged cross section taken along the line B-B in FIG. 1. FIGS. 4A to 4C are diagrammatic views for describing the action of the physical quantity sensor according to the first embodiment. Three axes shown in FIG. 1 to FIGS. 4A to 4C, X, Y, and Z axes, are perpendicular to each other. The Z axis indicates the direction in which gravity acts.

In the present embodiment, the description will be made assuming that a plan view of the physical quantity sensor 100 is viewed from the +Z axis side.

Structure of Physical Quantity Sensor

The physical quantity sensor 100 according to the present embodiment can be used, for example, as an inertia sensor. Specifically, the physical quantity sensor 100 can be used as an acceleration sensor for measuring acceleration or any other physical quantity acting in the +Z-axis direction (electrostatic-capacitance-based acceleration sensor, electrostatic-capacitance-based MEMS acceleration sensor).

The physical quantity sensor 100 includes a substrate 10, a detection device 20, a first wiring portion 50, a second wiring portion 60, an electrode 56, an electrode 66, a fixing portion 34, and a support portion 36, as shown in FIGS. 1 and 2.

The substrate 10 is provided in the form of a flat plate, and a recess 14 capable of accommodating the detection device 20 in a plan view is provided in the substrate 10 above a principal surface 12 (upper surface), which is an XY plane. In the present embodiment, the recess 14 accommodates the detection device 20, the fixing portion 34, the first wiring portion 50, the second wiring portion 60, the electrode 56, the electrode 66, and other components. Only the detection device 20 and the fixing portion 34 need to be disposed in the recess 14, and the first wiring portion 50, the second wiring portion 60, the electrode 56, the electrode 66, and other components may be disposed on the principal surface 12 outside the recess 14. The substrate 10 is not necessarily made of a specific material and can be made, for example, of borosilicate glass. The substrate 10 and a groove that will be described later may be formed, for example, in an etching process.

The detection device 20 includes a movable body 30, a first fixed electrode portion (first electrode portion) 21, and a second fixed electrode portion (second electrode portion) 22.

The first fixed electrode portion 21 and the second fixed electrode portion 22 are so provided on the principal surface 12 of the substrate 10 that they at least partially overlap with the movable body 30 in a plan view and they are set apart from each other with the fixing portion 34 therebetween.

The first fixed electrode portion 21 and the second fixed electrode portion 22 are made of a material having electrical conductivity, such as gold (Au), copper (Cu), aluminum (Al), or any other conductive material.

The movable body 30 is provided as a movable electrode. The movable body 30 is provided in the form of a flat plate and has an opening 33 formed in an XY plane in a position along a support axis Q. The opening 33 passes through the movable body 30 in the thickness direction thereof (Z direction), and the support portion 36 is provided in the opening 33.

The support portion 36 is formed along the support axis Q, which is an imaginary line extending in the Y direction, which is a first direction that intersects the direction perpendicular to the principal surface 12 of the substrate 10, and is made of the same material as that of the movable body 30.

The fixing portion 34 is a protrusion that protrudes toward the +Z side from the principal surface 12 (recess 14) of the substrate 10 and has, for example, a truncated pyramidal shape. The fixing portion 34 is located in the opening 33 in a plan view and has a through hole formed along the support axis Q, for example, in a position set apart from the principal surface 12 by a desired distance. The support portion 36, which supports the movable body 30, is inserted into the through hole of the fixing portion 34 and rotatably supported by the fixing portion 34.

The movable body 30, the first fixed electrode portion 21, and the second fixed electrode portion 22 are so provided that the fixing portion 34 causes the movable body 30 to be set apart from and to face the first fixed electrode portion 21 and the second fixed electrode portion 22. The support portion 36 is twistable in the rotational direction around the support axis Q as an axis of rotation, whereby the movable body 30 can pivot.

The movable body 30 is made of a material having electrical conductivity that allows the movable body 30 to function as a movable electrode. The movable body 30, the support portion 36, and the fixing portion 34 in the present embodiment can be made, for example, of silicon.

The movable body 30 is not necessarily made of a specific material. The movable body 30 can be made of a material having electrical conductivity or a material that is electrically insulating. When the movable body 30 is made of a material that is electrically insulating, an electrode film having electrical conductivity may be formed on a surface thereof facing the first fixed electrode portion 21 and the second fixed electrode portion 22.

Further, the movable body 30 has a movable region 31, which is a region located on the −X-axis side of the support axis Q, and a movable region 32, which is a region located on the +X-axis side of the support axis Q, and the movable regions 31 and 32 are provided in an asymmetric manner with respect to the support axis Q.

The first fixed electrode portion 21 and the second fixed electrode portion 22, which face the movable body 30, are located on the principal surface 12 on the −X-axis side and the +X-axis side of the support axis Q, respectively.

The first fixed electrode portion 21 is provided in a region where at least part thereof overlaps with the movable region 31 of the movable body 30, and the second fixed electrode portion 22 is provided in a region where at least part thereof overlaps with the movable region 32 of the movable body 30.

Since the movable body 30, the first fixed electrode portion 21, and the second fixed electrode portion 22 are so provided that the movable body 30 is set apart from the first fixed electrode portion 21 and the second fixed electrode portion 22 with the fixing portion 34 therebetween, the movable body 30 can make a seesaw swing motion (seesaw action) around the support portion 36 as the axis of rotation (axis of swing motion). The support portion 36 produces a restoration force against "torsional deformation" produced when the movable body 30 makes a seesaw swing motion and functions as a torsion spring. For example, when acceleration in the Z-axis direction is applied to the physical quantity sensor 100, the movable body 30 is allowed to make a seesaw swing motion around the support portion 36 as the axis of rotation (axis of swing motion) and incline toward the movable region 31, which faces the first fixed electrode portion 21, or toward the movable region 32, which faces the second fixed electrode portion 22.

Since the movable region 31 and the movable region 32 of the movable body 30 are provided in an asymmetric manner with respect to the support axis Q, the movable body 30, when acceleration or any other physical quantity is applied thereto, is allowed to incline toward a heavier one of the movable region 31 and the movable region 32. The support portion 36 may be provided in a position shifted from the center of the movable body 30.

The movable body 30 is provided as a movable electrode in a position where the movable body 30 faces the first fixed electrode portion 21 and the second fixed electrode portion 22 with a gap therebetween. Electrostatic capacitance (variable capacitance) C1 is created between the first fixed electrode portion 21 and the movable region 31 (movable body 30), which are disposed with a gap therebetween. Further, electrostatic capacitance (variable capacitance) C2 is created between the second fixed electrode portion 22 and the movable region 32 (movable body 30), which are disposed with a gap therebetween.

The electrostatic capacitance values C1 and C2 change with the gaps (distances) from the movable body 30 to the first fixed electrode portion 21 and the second fixed electrode portion 22.

For example, in a state in which the movable body 30, which is inclinable, is parallel to the principal surface 12 of the substrate 10, that is, in a state in which no acceleration or any other physical quantity is applied to the movable region 31 or 32 around the support axis Q, the electrostatic capacitance values C1 and C2 are equal to each other. In other words, the distance of the gap between the movable body 30 and the first fixed electrode portion 21 is equal to the distance of the gap between the movable body 30 and the second fixed electrode portion 22, and in a plan view, the area where the movable region 31 overlaps with the first fixed electrode portion 21 is equal to the area where the movable region 32 overlaps with the second fixed electrode portion 22, whereby the electrostatic capacitance values C1 and C2 are equal to each other accordingly.

On the other hand, in a state in which the movable body 30 inclines around the support axis Q (support portion 36) as the axis of rotation, that is, in a state in which acceleration or any other quantity is applied to the movable regions 31 and 32 around the support axis Q, the electrostatic capacitance values C1 and C2 change with the amount of inclination of the movable body 30. In other words, since the distance of the gap between the movable body 30 and the first fixed electrode portion 21 differs from the distance of the gap between the movable body 30 and the second fixed electrode portion 22, the electrostatic capacitance values C1 and C2 differ from each other in accordance with the distances of the gaps.

To output the electrostatic capacitance values C1 and C2, the first wiring portion 50, the second wiring portion 60, the electrode 56, and the electrode 66 are provided.

The first wiring portion 50 is formed of a first common line 52, which extends from the electrode 56 toward the +X-axis direction, and a first branch line 54, which extends in the −Y direction from a branch portion provided on the first common line 52 toward the first fixed electrode portion 21 and is connected thereto. Further, the second wiring portion 60 is formed of a second common line 62, which extends from the electrode 66 toward the +X-axis direction, and a second branch line 64, which extends in the −Y direction from the second common line 62 toward the second fixed electrode portion 22 and is connected thereto.

The first wiring portion 50 and the second wiring portion 60 have substantially the same length, whereby electrical characteristics thereof are substantially the same. Further, the first wiring portion 50 and the second wiring portion 60 are shaped in an asymmetric manner in a plan view.

The second common line 62 and the first branch line 54 intersect each other in a plan view. The first branch line 54 is placed in a groove 18 provided in the principal surface 12 of the substrate 10 and covered with an insulating member 80, as shown in FIG. 3. The insulating member 80 can be made, for example, of a silicon oxide.

As a result, the second common line 62, which is provided on the principal surface 12 of the substrate 10, extends over the first branch line 54, which is provided in the groove 18, with an air gap 19 between the second common line 62 and the first branch line 54.

The first wiring portion 50 and the second wiring portion 60 are therefore electrically insulated from each other by the insulating member 80 and the air gap 19, whereby no short circuit or other adverse effects will occur.

Further, the first common line 52 and the second common line 62 are so disposed that they have substantially the same length and are adjacent and parallel to each other with a desired spacing therebetween.

The electrostatic capacitance value C1 (change in capacitance) can therefore be outputted through the first wiring portion 50, which is connected to the first fixed electrode portion 21, and then through the electrode 56. Further, the electrostatic capacitance value C2 (change in capacitance) can be outputted through the second wiring portion 60, which is connected to the second fixed electrode portion 22, and then through the electrode 66.

Each of the first wiring portion 50 (first common line 52), the second wiring portion 60 (second common line 62 and second branch line 64), the electrode 56, and the electrode 66 can, for example, be an electrically conductive film formed of a ground film made of chromium (Cr) on which gold (Au) or any other metal is formed.

The first branch line 54 can, for example, be formed of an electrically conductive structure made, for example, of silicon.

Action of Physical Quantity Sensor 100

A description will be made of the action of the physical quantity sensor 100 according to the present embodiment.

The physical quantity sensor 100 according to the present embodiment is, for example, so configured that when acceleration in the Z-axis direction (gravitational acceleration, for example) is applied to the movable body 30, a rotation moment (moment of force) is produced in each of the movable regions 31 and 32 of the movable body 30, and the movable body 30 inclines in accordance with the rotation moment.

A description will next be made of the action of the movable body 30 and changes in the electrostatic capacitance values C1 and C2 in response to the action. FIGS. 4A to 4C describe the action of the movable body 30 and changes in the electrostatic capacitance values C1 and C2 that occur when acceleration or any other physical quantity is applied to the physical quantity sensor 100. In FIGS. 4A to 4C, the substrate 10, the fixing portion 34, the support portion 36, and other components are omitted for the purpose of clearly showing the action of the physical quantity sensor 100.

FIG. 4A shows a state in which no acceleration is applied to the physical quantity sensor 100. In this state, the movable body 30 maintains its horizontal state (is balanced). The state also corresponds to a state in which no gravitational acceleration is applied (null gravitational state).

In the state shown in FIG. 4A, the distance from the movable body 30 to the first fixed electrode portion 21 and the distance from the movable body 30 to the second fixed electrode portion 22 are equal to each other, and in a plan view, the area where the movable region 31 overlaps with the first fixed electrode portion 21 and the area where the movable region 32 overlaps with the second fixed electrode portion 22 are equal to each other. As a result, the electrostatic capacitance values C1 and C2 are equal to each other.

FIG. 4B shows a state in which acceleration G1 acting in the −Z-axis direction is applied to the movable body 30.

In response to the application, a clockwise force when viewed from the +Y direction around the support axis Q as the axis of rotation acts on the movable body 30, resulting in inclination of the movable body 30. In other words, the movable body 30 makes a seesaw swing motion around the support axis Q as the axis of rotation, which inclines the movable region 32 in the −Z-axis direction.

The gap between the second fixed electrode portion 22 and the movable body 30 (movable region 32) therefore decreases (narrows). As a result, the electrostatic capacitance value C2 increases as compared with the electrostatic capacitance value C2 in the case shown in FIG. 4A where the movable body 30 is balanced.

On the other hand, the gap between the first fixed electrode portion 21 and the movable body 30 (movable region 31) increases (widens). As a result, the electrostatic capacitance value C1 decreases as compared with the electrostatic capacitance value C1 in the case shown in FIG. 4A where the movable body 30 is balanced.

FIG. 4C shows a state in which acceleration G2 toward the +Z-axis direction is applied to the movable body 30.

In response to the application, a counterclockwise force when viewed from the +Y direction around the support axis Q as the axis of rotation acts on the movable body 30, resulting in inclination of the movable body 30. In other words, the movable body 30 makes a seesaw swing motion around the support axis Q as the axis of rotation, which inclines the movable region 31 in the −Z-axis direction.

The gap between the first fixed electrode portion 21 and the movable body 30 (movable region 31) therefore decreases (narrows). As a result, the electrostatic capacitance value C1 increases as compared with the electrostatic capacitance value C1 in the case shown in FIG. 4A where the movable body 30 is balanced.

On the other hand, the gap between the second fixed electrode portion 22 and the movable body 30 (movable region 32) increases (widens). As a result, the electrostatic capacitance value C2 decreases as compared with the electrostatic capacitance value C2 in the case shown in FIG. 4A where the movable body 30 is balanced.

The physical quantity sensor 100 according to the present embodiment can detect the magnitude and direction of acceleration based on changes in the electrostatic capacitance values C1 and C2. Specifically, the physical quantity sensor 100 can detect the value of the acceleration (G1, G2) based on the degree of a change in each of the two capacitance values.

For example, with reference to the capacitance value obtained in the state shown in FIG. 4A (state in which no acceleration is applied to movable body 30), evaluating a change in each of the capacitance values in the state shown in FIG. 4B allows detection of the direction and magnitude of the applied acceleration G1 in the state shown in FIG. 4B. That is, the value of the applied acceleration G1 can be detected based on a change in each of the electrostatic capacitance values C1 and C2 obtained in the state shown in FIG. 4B, specifically, based on the degree of the change.

Similarly, for example, with reference to the capacitance value obtained in the state shown in FIG. 4A, evaluating a change in each of the capacitance values in the state shown in FIG. 4C allows detection of the direction and magnitude of the applied acceleration G2 in the state shown in FIG. 4C. That is, the value of the applied acceleration G2 can be detected based on a change in each of the electrostatic capacitance values C1 and C2 obtained in the state shown in FIG. 4C, specifically, based on the degree of the change.

As described above, the physical quantity sensor 100 can be used as an inertia sensor, such as an acceleration sensor and a gyro sensor. For example, the physical quantity sensor 100 can be used as an electrostatic-capacitance-based acceleration sensor for measuring acceleration in the Z-axis direction.

According to the first embodiment described above, the following advantageous effects are provided.

According to the thus configured physical quantity sensor 100, the first wiring portion 50, which is connected to the first fixed electrode portion 21, and the second wiring portion 60, which is connected to the second fixed electrode portion 22, are arranged in an asymmetric manner and have substantially the same electric characteristics.

The first common line 52 (electrostatic capacitance value C1), which is connected to the first wiring portion 50, and the second common line 62 (electrostatic capacitance value C2), which is connected to the second wiring portion 60, are so provided that they are parallel and adjacent to each other and have substantially the same length. As a result, disturbance (such as electrostatic noise) that enters the first common line 52 and the disturbance that enters the second common line 62 are allowed to have substantially the same phase and magnitude. Subtracting the output from one of the first wiring portion 50 and the second wiring portion 60 from the output from the other wiring portion allows cancellation of the noise, which causes inaccuracy in detection sensitivity, in the capacitance values for accurate determination of acceleration.

Therefore, configuring part of the first wiring portion 50 and part of the second wiring portion 60 in such a way that these portions are parallel to each other and have substantially the same length allows an increase in measurement precision of the physical quantity sensor 100.

Second Embodiment

A functional device according to a second embodiment will be described with reference to FIG. 5 to FIGS. 7A to 7E based, for example, on a case where the functional device is used as a physical quantity sensor.

Figure 5:
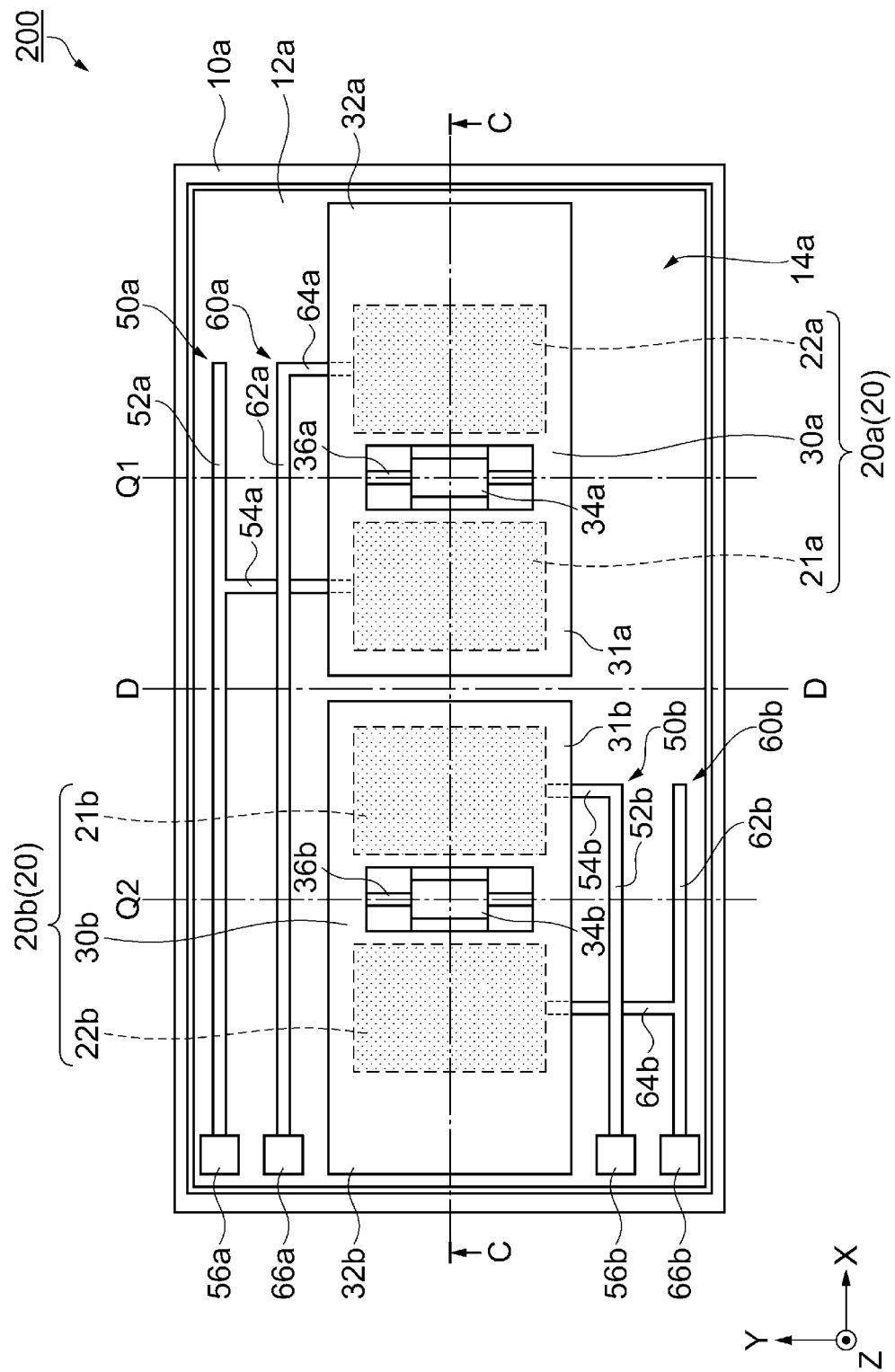
FIG. 5 is a plan view showing the configuration of a physical quantity sensor according to a second embodiment.
Figure 6:
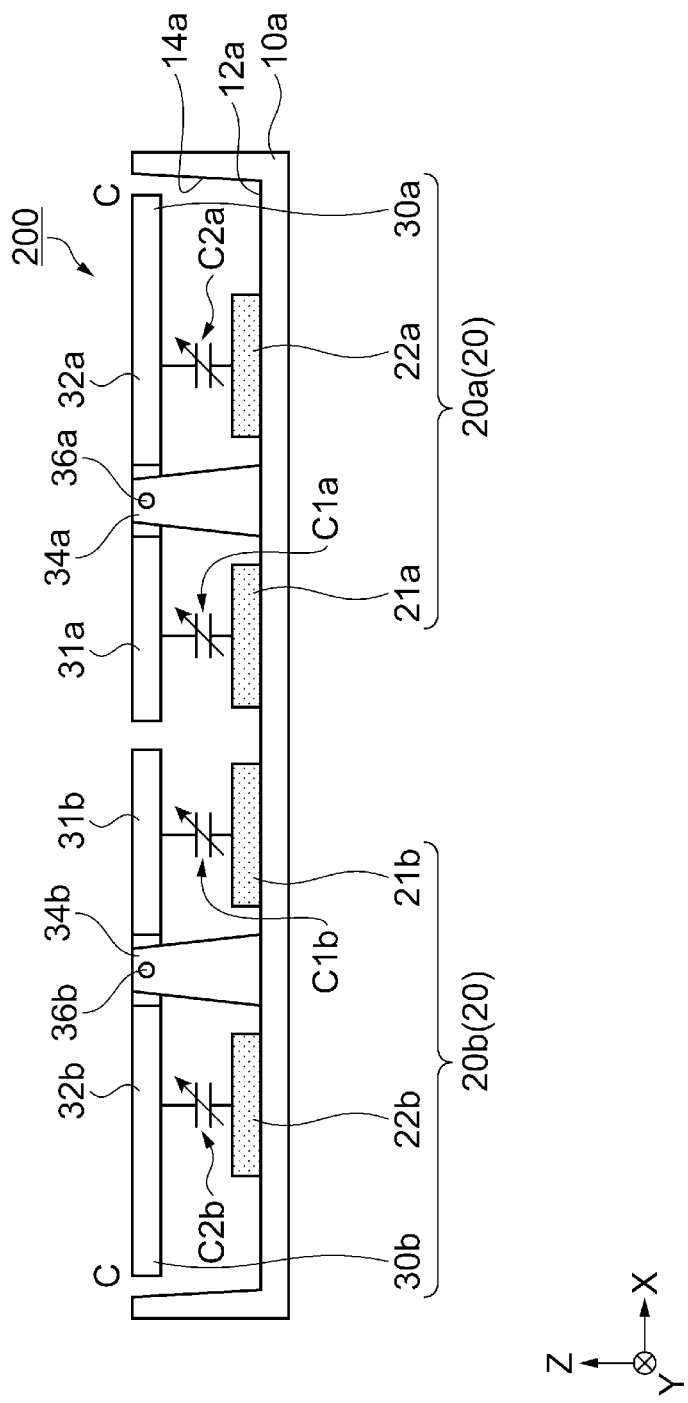
FIG. 6 is a cross-sectional view of the physical quantity sensor taken along the line C-C in FIG. 5.

FIG. 5 is a plan view showing the configuration of a physical quantity sensor 200 according to the second embodiment. FIG. 6 is a cross-sectional view showing the configuration of the physical quantity sensor 200 and shows a cross section taken along the line C-C in FIG. 5. FIGS. 7A to 7E are diagrammatic views for describing the action of the physical quantity sensor 200 according to the second embodiment. Three axes shown in FIG. 5 to FIGS. 7A to 7E, X, Y, and Z axes, are perpendicular to each other. The Z axis indicates the direction in which gravity acts.

In the present embodiment, the description will be made assuming that a plan view of the physical quantity sensor 200 is viewed in the Z axis direction.

The physical quantity sensor 200 according to the second embodiment is so configured that the physical quantity sensor 100 configured as described above is provided at a plurality of locations. The same constituent members as those in the first embodiment have the same reference characters, and they are not described or are described in a simplified manner.

Structure of Physical Quantity Sensor

The physical quantity sensor 200 shown in FIG. 5 to FIGS. 7A to 7E includes a substrate 10a, the detection device 20 (20a, 20b) in the physical quantity sensor 100 described above, first wiring portions 50a and 50b, second wiring portions 60a and 60b, electrodes 56a and 56b, electrodes 66a and 66b, and fixing portions 34a and 34b.

The substrate 10a provided in the physical quantity sensor 200 has an elongated rectangular shape the longer sides of which extend in the X direction, as shown in FIG. 5. A recess 14a capable of accommodating two detection devices 20 is provided in the substrate 10a, and the two detection devices 20 are provided in the recess 14a.

In the detection devices 20, not only a first fixed electrode portion 21a and a first fixed electrode portion 21b but also a second fixed electrode portion 22a and a second fixed electrode portion 22b are provided in a symmetric manner with respect to a line D-D extending in the Y direction.

The detection device 20 provided on the +X-axis side of the line D-D is called a first fixed device 20a, and the detection device 20 provided on the −X-axis side of the line D-D is called a second fixed device 20b.

The first fixed device 20a includes a movable body 30a, the first fixed electrode portion 21a, and the second fixed electrode portion 22a. The movable body 30a has a support portion 36a. The support portion 36a is formed along a support axis Q1, which is an imaginary line extending in the Y direction, which is a first direction that intersects the direction perpendicular to a principal surface 12a of the substrate 10a. The movable body 30a is rotatably supported by the fixing portion 34a via the support portion 36a. The movable body 30a, the first fixed electrode portion 21a, and the second fixed electrode portion 22a are so provided on the substrate 10a that the movable body 30a is set apart from the first fixed electrode portion 21a and the second fixed electrode portion 22a with the fixing portion 34a therebetween. Further, the movable body 30a has a movable region 31a, which is located on the −X-axis direction side of the support axis Q1, and a movable region 32a, which is located on the +X-axis direction side of the support axis Q1. The movable regions 31a and 32a are provided in an asymmetric manner with respect to the support axis Q1.

The second fixed device 20b includes a movable body 30b, the first fixed electrode portion 21b, and the second fixed electrode portion 22b. The movable body 30b has a support portion 36b. The support portion 36b is formed along a support axis Q2, which is an imaginary line extending in the Y direction, which is the first direction that intersects the direction perpendicular to the principal surface 12a of the substrate 10a. The movable body 30b is rotatably supported by the fixing portion 34b via the support portion 36b. The movable body 30b, the first fixed electrode portion 21b, and the second fixed electrode portion 22b are so provided on the substrate 10a that the movable body 30b is set apart from the first fixed electrode portion 21b and the second fixed electrode portion 22b with the fixing portion 34b therebetween. Further, the movable body 30b has a movable region 31b, which is located on the +X-axis direction side of the support axis Q2, and a movable region 32b, which is located on the −X-axis direction side of the support axis Q2. The movable regions 31b and 32b are provided in an asymmetric manner with respect to the support axis Q2.

In a plan view, the first fixed electrode portion 21a and the second fixed electrode portion 22a are provided on the principal surface 12a of the substrate 10a in a region facing the movable body 30a. The first fixed electrode portion 21a is provided in a region located on the −X-axis direction side of the support axis Q1 and facing the movable region 31a. Further, the second fixed electrode portion 22a is provided in a region located on the +X-axis side of the support axis Q1 and facing the movable region 32a.

In a plan view, the first fixed electrode portion 21a and the second fixed electrode portion 22a are so provided that at least part of them overlaps with the movable body 30a and they are set apart from each other with the fixing portion 34a therebetween.

In other words, in a plan view, the first fixed electrode portion 21a is so provided that at least part thereof overlaps with and faces the movable region 31a, and the second fixed electrode portion 22a is so provided that at least part thereof overlaps with and faces the movable region 32a.

In a plan view, the first fixed electrode portion 21b and the second fixed electrode portion 22b are provided on the principal surface 12a of the substrate 10a in a region facing the movable body 30b. The first fixed electrode portion 21b is provided in a region located on the +X-axis side of the support axis Q2 and facing the movable region 31b. Further, the second fixed electrode portion 22b is provided in a region located on the −X-axis side of the support axis Q2 and facing the movable region 32b.

In a plan view, the first fixed electrode portion 21b and the second fixed electrode portion 22b are so provided that at least part of them overlaps with the movable body 30b and they are set apart from each other with the fixing portion 34b therebetween.

In other words, in a plan view, the first fixed electrode portion 21b is so provided that at least part thereof overlaps with and faces the movable region 31b, and the second fixed electrode portion 22b is so provided that at least part thereof overlaps with and faces the movable region 32b.

The support portion 36a is twistable in the rotational direction around the support axis Q1 as an axis of rotation, whereby the movable body 30a can pivot.

The support portion 36b is twistable in the rotational direction around the support axis Q2 as an axis of rotation, whereby the movable body 30b can pivot.

When acceleration in the Z-axis direction is applied to the movable body 30a, the movable body 30a can make a seesaw swing motion (seesaw action) around the support portion 36a, which extends along the support axis Q1 and serves as the axis of rotation (axis of swing motion). In other words, since the support portion 36a functions as a torsion spring, the movable body 30a is allowed to incline toward the movable region 31a, which faces the first fixed electrode portion 21a, or toward the movable region 32a, which faces the second fixed electrode portion 22a.

Similarly, when acceleration in the Z-axis direction is applied to the movable body 30b, the movable body 30b can make a seesaw swing motion (seesaw action) around the support portion 36b, which extends along the support axis Q2 and serves as the axis of rotation (axis of swing motion). In other words, since the support portion 36b functions as a torsion spring, the movable body 30b is allowed to incline toward the movable region 31b, which faces the first fixed electrode portion 21b, or toward the movable region 32b, which faces the second fixed electrode portion 22b.

The support portion 36a produces a restoration force against "torsional deformation" produced when the movable body 30a makes a seesaw swing motion, and the restoration force prevents the support portion 36a from being broken.

The support portion 36b produces a restoration force against "torsional deformation" produced when the movable body 30b makes a seesaw swing motion, and the restoration force prevents the support portion 36b from being broken.

Since the movable region 31a and the movable region 32a of the movable body 30a are provided in an asymmetric manner with respect to the support axis Q1, the movable body 30a, when acceleration or any other physical quantity is applied thereto, is allowed to incline toward a heavier one of the movable region 31a and the movable region 32a. The support portion 36a may be provided in a position shifted from the center of the movable body 30a.

Similarly, since the movable region 31b and the movable region 32b of the movable body 30b are provided in an asymmetric manner with respect to the support axis Q2, the movable body 30b, when acceleration or any other physical quantity is applied thereto, is allowed to incline toward a heavier one of the movable region 31b and the movable region 32b. The support portion 36b may be provided in a position shifted from the center of the movable body 30b.

Each of the movable bodies 30a and 30b is made of a material having electrical conductivity that allows the movable body to function as a movable electrode. The movable bodies 30a and 30b, the support portions 36a and 36b, and the fixing portions 34a and 34b in the present embodiment are made, for example, of silicon. The movable bodies 30a and 30b are not necessarily made of a specific material and only need to be made of a material having electrical conductivity. The movable bodies 30a and 30b can instead be made of a material that is electrically insulating. When the movable body 30a is made of a material that is electrically insulating, an electrode film having electrical conductivity only needs be formed on a surface thereof facing the first fixed electrode portion 21a and the second fixed electrode portion 22a. Similarly, when the movable body 30b is made of a material that is electrically insulating, an electrode film having electrical conductivity only needs to be formed on a surface thereof facing the first fixed electrode portion 21b and the second fixed electrode portion 22b.

As shown in FIG. 6, electrostatic capacitance (variable capacitance) C1a is created between the first fixed electrode portion 21a and the movable region 31a (movable body 30a), which are disposed with a gap therebetween. Further, electrostatic capacitance (variable capacitance) C2a is created between the second fixed electrode portion 22a and the movable region 32a (movable body 30a), which are disposed with a gap therebetween.

Similarly, electrostatic capacitance (variable capacitance) C1b is created between the first fixed electrode portion 21b and the movable region 31b (movable body 30b), which are disposed with a gap therebetween. Further, electrostatic capacitance (variable capacitance) C2b is created between the second fixed electrode portion 22b and the movable region 32b (movable body 30b), which are disposed with a gap therebetween.

The electrostatic capacitance values C1a and C2a change with the gaps (distances) from the movable body 30a to the first fixed electrode portion 21a and the second fixed electrode portion 22a.

For example, in a state in which the movable body 30a, which is inclinable, is horizontally oriented, that is, in a state in which no acceleration or any other physical quantity is applied to the movable region 31a or 32a around the support axis Q1, the electrostatic capacitance values C1a and C2a are equal to each other. In other words, the distance of the gap between the movable body 30a and the first fixed electrode portion 21a is equal to the distance of the gap between the movable body 30a and the second fixed electrode portion 22a, and in a plan view, the area where the movable region 31a overlaps with the first fixed electrode portion 21a is equal to the area where the movable region 32a overlaps with the second fixed electrode portion 22a, whereby the electrostatic capacitance values C1a and C2a are equal to each other accordingly.

On the other hand, in a state in which the movable body 30a inclines around the support axis Q1 as the axis of rotation, that is, in a state in which acceleration is applied to the movable regions 31a and 32a around the support axis Q1, the electrostatic capacitance values C1a and C2a change with the amount of inclination of the movable body 30a. In other words, since the distance (size) of the gap between the movable body 30a and the first fixed electrode portion 21a differs from the distance (size) of the gap between the movable body 30a and the second fixed electrode portion 22a, the electrostatic capacitance values C1a and C2a differ from each other in accordance with the distances (sizes) of the gaps.

The electrostatic capacitance values C1b and C2b change with the gaps (distances) from the movable body 30b to the first fixed electrode portion 21b and the second fixed electrode portion 22b.

For example, in a state in which the movable body 30b, which is inclinable, is horizontally oriented, that is, in a state in which no acceleration or any other physical quantity is applied to the movable region 31b or 32b around the support axis Q2, the electrostatic capacitance values C1b and C2b are equal to each other. In other words, the distance of the gap between the movable body 30b and the first fixed electrode portion 21b is equal to the distance of the gap between the movable body 30b and the second fixed electrode portion 22b, and in a plan view, the area where the movable region 31b overlaps with the first fixed electrode portion 21b is equal to the area where the movable region 32b overlaps with the second fixed electrode portion 22b, whereby the electrostatic capacitance values C1b and C2b are equal to each other accordingly.

Further, in a state in which the movable body 30b inclines around the support axis Q2 as the axis of rotation, that is, in a state in which acceleration is applied to the movable regions 31b and 32b around the support axis Q2, the electrostatic capacitance values C1b and C2b change with the amount of inclination of the movable body 30b. In other words, since the distance of the gap between the movable body 30b and the first fixed electrode portion 21b differs from the distance of the gap between the movable body 30b and the second fixed electrode portion 22b, the electrostatic capacitance values C1b and C2b differ from each other in accordance with the distances of the gaps.

The physical quantity sensor 200 includes the first wiring portion 50a, the second wiring portion 60a, the electrode 56a, and the electrode 66a to output the electrostatic capacitance values C1a and C2a, and the first wiring portion 50b, the second wiring portion 60b, the electrode 56b, and the electrode 66b to output the electrostatic capacitance values C1b and C2b.

The first wiring portion 50a is formed of a first common line 52a, which extends from the electrode 56a, and a first branch line 54a, which extends from a branch portion provided on the first common line 52a toward the first fixed electrode portion 21a and is connected thereto. Further, the second wiring portion 60a is formed of a second common line 62a, which extends from the electrode 66a, and a second branch line 64a, which extends from the second common line 62a toward the second fixed electrode portion 22a and is connected thereto.

The first wiring portion 50a and the second wiring portion 60a have substantially the same length, whereby electrical characteristics thereof are substantially the same. Further, the first wiring portion 50a and the second wiring portion 60a are shaped in an asymmetric manner in a plan view.

The second common line 62a and the first branch line 54a intersect each other in a plan view. The first branch line 54a is placed in a groove provided in the principal surface 12a of the substrate 10a and covered with an insulating member.

As a result, the second common line 62a, which is provided on the principal surface 12a of the substrate 10a, extends over the first branch line 54a, which is provided in the groove, with an air gap between the second common line 62a and the first branch line 54a.

The first wiring portion 50a and the second wiring portion 60a are therefore electrically insulated from each other by the insulating member and the air gap, whereby no short circuit or other adverse effects will occur.

Further, the first common line 52a and the second common line 62a are so disposed that they have substantially the same length and are adjacent and parallel to each other with a desired spacing therebetween.

The first wiring portion 50b is formed of a first common line 52b, which extends from the electrode 56b, and a first branch line 54b, which extends from the first common line 52b toward the first fixed electrode portion 21b and is connected thereto. Further, the second wiring portion 60b is formed of a second common line 62b, which extends from the electrode 66b, and a second branch line 64b, which extends from a branch portion provided on the second common line 62b toward the second fixed electrode portion 22b and is connected thereto.

The first wiring portion 50b and the second wiring portion 60b have substantially the same length, whereby electrical characteristics thereof are substantially the same. Further, the first wiring portion 50b and the second wiring portion 60b are shaped in an asymmetric manner in a plan view.

The first common line 52b and the second branch line 64b intersect each other in a plan view. The second branch line 64b is placed in a groove provided in the principal surface 12a of the substrate 10a and covered with an insulating member. The insulating member can be made, for example, of a silicon oxide.

As a result, the first common line 52b, which is provided on the principal surface 12a of the substrate 10a, extends over the second branch line 64b, which is provided in the groove, with an air gap between the first common line 52b and the second branch line 64b.

The first wiring portion 50b and the second wiring portion 60b are therefore electrically insulated from each other by the insulating member and the air gap, whereby no short circuit or other adverse effects will occur.

Further, the first common line 52b and the second common line 62b are so disposed that they have substantially the same length and are adjacent and parallel to each other with a desired spacing therebetween.

The electrostatic capacitance value C1a (change in capacitance) can be outputted through the first wiring portion 50a, which is connected to the first fixed electrode portion 21a, and then through the electrode 56a. Further, the electrostatic capacitance value C2a (change in capacitance) can be outputted through the second wiring portion 60a, which is connected to the second fixed electrode portion 22a, and then through the electrode 66a.

The electrostatic capacitance value C1b (change in capacitance) can be outputted through the first wiring portion 50b, which is connected to the first fixed electrode portion 21b, and then through the electrode 56b. Further, the electrostatic capacitance value C2b (change in capacitance) can be outputted through the second wiring portion 60b, which is connected to the second fixed electrode portion 22b, and then through the electrode 66b.

Each of the first wiring portion 50a (first common line 52a), the second wiring portion 60a (second common line 62a and second branch line 64a), the electrode 56a, the electrode 66a, the first wiring portion 50b (first common line 52b and first branch line 54b), the second wiring portion 60b (second common line 62b), the electrode 56b, and the electrode 66b can, for example, be an electrically conductive film formed of a ground film made of chromium (Cr) on which gold (Au) or any other metal is formed.

Each of the first branch line 54 and the second branch line 64b can, for example, be formed of an electrically conductive structure made, for example, of silicon.

In the physical quantity sensor 200 according to the present embodiment, the support portion 36a, the fixing portion 34a, the movable body 30a, the support portion 36b, the fixing portion 34b, and the movable body 30b can be made, for example, of silicon.

Each of the movable body 30a and the movable body 30b is not necessarily made of a specific material. Each of the movable body 30a and the movable body 30b can be made of a material having electrical conductivity or a material that is electrically insulating. When each of the movable body 30a and the movable body 30b is made of a material that is electrically insulating, an electrode film having electrical conductivity only needs to be formed on a surface thereof facing the first fixed electrode portion 21a and the second fixed electrode portion 22a or the first fixed electrode portion 21b and the second fixed electrode portion 22b.

Action of Physical Quantity Sensor 200

A description will be made of the action of the physical quantity sensor 200 according to the present embodiment.

The physical quantity sensor 200 according to the present embodiment is, for example, so configured that when acceleration in the Z-axis direction (gravitational acceleration, for example) is applied to the movable bodies 30a and 30b, a rotation moment (moment of force) is produced in each of the movable regions 31a and 32a of the movable body 30a and the movable regions 31b and 32b of the movable body 30b, and the movable bodies 30a and 30b incline in accordance with the rotation moment.

A description will next be made of the action of the movable bodies 30a and 30b and changes in the electrostatic capacitance values C1a, C2a, C1b, and C2b in response to the action. FIGS. 7A to 7E describe the action of the movable bodies 30a and 30b and changes in the electrostatic capacitance values C1a, C2a, C1b, and C2b that occur when acceleration or any other physical quantity is applied to the physical quantity sensor 200. In FIGS. 7A to 7E, the substrate 10a, the fixing portions 34a and 34b, the support portions 36a and 36b, and other components are omitted for the purpose of clearly showing the action of the physical quantity sensor 200.

FIG. 7A shows a state in which no acceleration is applied to the physical quantity sensor 200. In this state, the movable bodies 30a and 30b maintain their horizontal states (are balanced). The state also corresponds to a state in which no gravitational acceleration is applied (null gravitational state).

In the state shown in FIG. 7A, the distance from the movable body 30a to the first fixed electrode portion 21a, the distance from the movable body 30a to the second fixed electrode portion 22a, the distance from the movable body 30b to the first fixed electrode portion 21b, and the distance from the movable body 30b to the second fixed electrode portion 22b are equal to each other. As a result, the electrostatic capacitance values C1a, C2a, C1b, and C2b are equal to each other.

FIG. 7B shows a state in which acceleration G1 acting in the −Z-axis direction is applied to the movable bodies 30a and 30b.

In response to the application, a clockwise force when viewed from the +Y direction around the support axis Q1 as the axis of rotation acts on the movable body 30a, resulting in inclination of the movable body 30a. In other words, the movable body 30a makes a seesaw swing motion around the support axis Q1 as the axis of rotation, which inclines the movable region 32a in the −Z-axis direction. Further, a counterclockwise force when viewed from the +Y direction around the support axis Q2 as the axis of rotation acts on the movable body 30b, resulting in inclination of the movable body 30b. In other words, the movable body 30b makes a seesaw swing motion around the support axis Q2 as the axis of rotation, which inclines the movable region 32b toward the −Z-axis direction.

The gap between the second fixed electrode portion 22a and the movable body 30a (movable region 32a) therefore decreases (narrows). As a result, the electrostatic capacitance value C2a increases as compared with the electrostatic capacitance value C2a in the case shown in FIG. 7A where the movable body 30a is balanced.

On the other hand, the gap between the first fixed electrode portion 21a and the movable body 30a (movable region 31a) increases (widens). As a result, the electrostatic capacitance value C1a decreases as compared with the electrostatic capacitance value C1a in the case shown in FIG. 7A where the movable body 30a is balanced.

Further, the gap between the second fixed electrode portion 22b and the movable body 30b (movable region 32b) decreases (narrows). As a result, the electrostatic capacitance value C2b increases as compared with the electrostatic capacitance value C2b in the case shown in FIG. 7A where the movable body 30b is balanced.

On the other hand, the gap between the first fixed electrode portion 21b and the movable body 30b (movable region 31b) increases (widens). As a result, the electrostatic capacitance value C1b decreases as compared with the electrostatic capacitance value C1b in the case shown in FIG. 7A where the movable body 30b is balanced.

FIG. 7C shows a state in which acceleration G2 toward the +Z-axis direction is applied to the movable bodies 30a and 30b.

In response to the application, a counterclockwise force when viewed from the +Y side around the support axis Q1 as the axis of rotation acts on the movable body 30a, resulting in inclination of the movable body 30a. In other words, the movable body 30a makes a seesaw swing motion around the support axis Q1 as the axis of rotation, which inclines the movable region 31a in the −Z-axis direction. Further, a clockwise force when viewed from the +Y direction around the support axis Q2 as the axis of rotation acts on the movable body 30b, resulting in inclination of the movable body 30b. In other words, the movable body 30b makes a seesaw swing motion around the support axis Q2 as the axis of rotation, which inclines the movable region 31b in the −Z-axis direction.

The gap between the first fixed electrode portion 21a and the movable body 30a (movable region 31a) therefore decreases (narrows). As a result, the electrostatic capacitance value C1a increases as compared with the electrostatic capacitance value C1a in the case shown in FIG. 7A where the movable body 30a is balanced.

On the other hand, the gap between the second fixed electrode portion 22a and the movable body 30a (movable region 32a) increases (widens). As a result, the electrostatic capacitance value C2a decreases as compared with the electrostatic capacitance value C2a in the case shown in FIG. 7A where the movable body 30a is balanced.

Further, the gap between the first fixed electrode portion 21b and the movable body 30b (movable region 31b) decreases (narrows). As a result, the electrostatic capacitance value C1b increases as compared with the electrostatic capacitance value C1b in the case shown in FIG. 7A where the movable body 30b is balanced.

On the other hand, the gap between the second fixed electrode portion 22b and the movable body 30b (movable region 32b) increases (widens). As a result, the electrostatic capacitance value C2b decreases as compared with the electrostatic capacitance value C2b in the case shown in FIG. 7A where the movable body 30b is balanced.

Figure 7D:
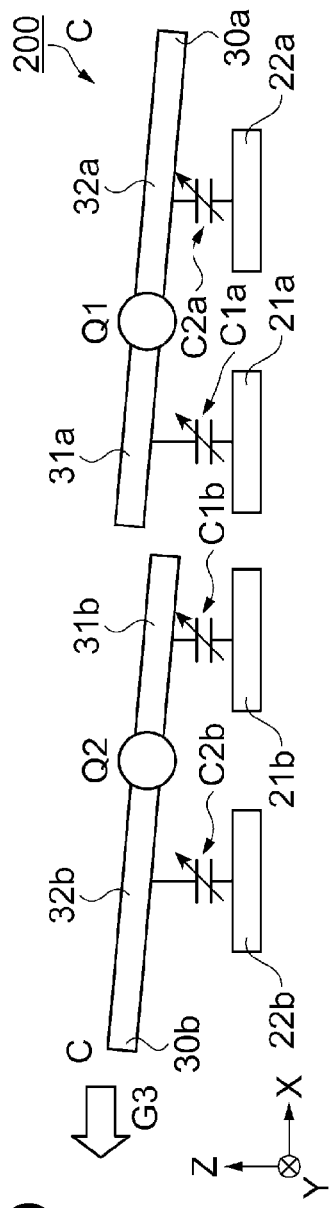

FIG. 7D shows a state in which acceleration G3 acting in the direction from the +X-axis side toward the −X-axis side is applied to the movable bodies 30a and 30b.

In response to the application, a clockwise force when viewed from the +Y direction around the support axis Q1 as the axis of rotation acts on the movable body 30a, resulting in inclination of the movable body 30a. In other words, the movable body 30a makes a seesaw swing motion around the support axis Q1 as the axis of rotation, which inclines the movable region 32a in the −Z-axis direction. Further, a clockwise force when viewed from the +Y direction around the support axis Q2 as the axis of rotation acts on the movable body 30b, resulting in inclination of the movable body 30b. In other words, the movable body 30b makes a seesaw swing motion around the support axis Q2 as the axis of rotation, which inclines the movable region 31b in the −Z-axis direction.

The gap between the second fixed electrode portion 22a and the movable body 30a (movable region 32a) therefore decreases (narrows). As a result, the electrostatic capacitance value C2a increases as compared with the electrostatic capacitance value C2a in the case shown in FIG. 7A where the movable body 30a is balanced.

On the other hand, the gap between the first fixed electrode portion 21a and the movable body 30a (movable region 31a) increases (widens). As a result, the electrostatic capacitance value C1a decreases as compared with the electrostatic capacitance value C1a in the case shown in FIG. 7A where the movable body 30a is balanced.

Further, the gap between the first fixed electrode portion 21b and the movable body 30b (movable region 31b) decreases (narrows). As a result, the electrostatic capacitance value C1b increases as compared with the electrostatic capacitance value C1b in the case shown in FIG. 7A where the movable body 30b is balanced.

On the other hand, the gap between the second fixed electrode portion 22b and the movable body 30b (movable region 32b) increases (widens). As a result, the electrostatic capacitance value C2b decreases as compared with the electrostatic capacitance value C2b in the case shown in FIG. 7A where the movable body 30b is balanced.

Figure 7E:
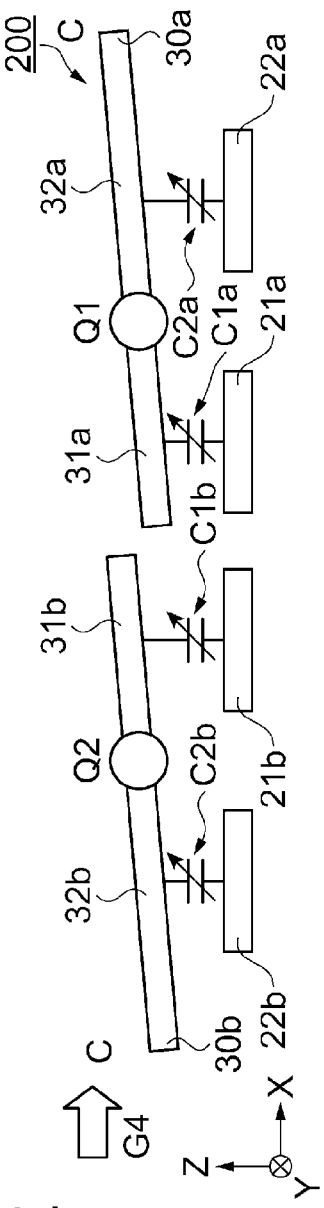

FIG. 7E shows a state in which acceleration G4 acting in the direction from the −X-axis direction toward the +X-axis direction is applied to the movable bodies 30a and 30b.

In response to the application, a counterclockwise force when viewed from the +Y side around the support axis Q1 as the axis of rotation acts on the movable body 30a, resulting in inclination of the movable body 30a. In other words, the movable body 30a makes a seesaw swing motion around the support axis Q1 as the axis of rotation, which inclines the movable region 31a in the −Z-axis direction. Further, a clockwise force when viewed from the +Y direction around the support axis Q2 as the axis of rotation acts on the movable body 30b, resulting in inclination of the movable body 30b. In other words, the movable body 30b makes a seesaw swing motion around the support axis Q2 as the axis of rotation, which inclines the movable region 31b toward the +Z-axis direction.

The gap between the first fixed electrode portion 21a and the movable body 30a (movable region 31a) therefore decreases (narrows). As a result, the electrostatic capacitance value C1a increases as compared with the electrostatic capacitance value C1a in the case shown in FIG. 7A where the movable body 30a is balanced.

On the other hand, the gap between the second fixed electrode portion 22a and the movable body 30a (movable region 32a) increases (widens). As a result, the electrostatic capacitance value C2a decreases as compared with the electrostatic capacitance value C2a in the case shown in FIG. 7A where the movable body 30a is balanced.

Further, the gap between the second fixed electrode portion 22b and the movable body 30b (movable region 32b) decreases (narrows). As a result, the electrostatic capacitance value C2b increases as compared with the electrostatic capacitance value C2b in the case shown in FIG. 7A where the movable body 30b is balanced.

On the other hand, the gap between the first fixed electrode portion 21b and the movable body 30b (movable region 31b) increases (widens). As a result, the electrostatic capacitance value C1b decreases as compared with the electrostatic capacitance value C1b in the case shown in FIG. 7A where the movable body 30b is balanced.

The physical quantity sensor 200 according to the present embodiment can detect the magnitude and direction of acceleration based on changes in the electrostatic capacitance values C1a, C2a, C1b, and C2b. Specifically, the physical quantity sensor 200 can detect the value of the acceleration (G1, G2) based on the degree of a change in each of the four capacitance values.

For example, with reference to the capacitance value obtained in the state shown in FIG. 7A (state in which no acceleration is applied), evaluating a change in each of the capacitance values in the state shown in FIG. 7B allows detection of the direction and magnitude of the applied acceleration G1 in the state shown in FIG. 7B. That is, the value of the applied acceleration G1 can be detected based on a change in each of the electrostatic capacitance values C1a, C2a, C1b, and C2b obtained in the state shown in FIG. 7B, specifically, based on the degree of the change.

Similarly, for example, with reference to the capacitance value obtained in the state shown in FIG. 7A, evaluating a change in each of the capacitance values in the state shown in FIG. 7C allows detection of the direction and magnitude of the applied acceleration G2 in the state shown in FIG. 7C. That is, the value of the applied acceleration G2 can be detected based on a change in each of the electrostatic capacitance values C1a, C2a, C1b, and C2b obtained in the state shown in FIG. 7C, specifically, based on the degree of the change.

Further, evaluating a change in each of the electrostatic capacitance values C1a, C2a, C1b, and C2b obtained in the state shown in FIG. 7D or 7E allows detection of the direction in which the acceleration (acceleration G3, G4) is applied.

For example, when the acceleration G3 is applied to the movable bodies 30a and 30b, the relationship among the electrostatic capacitance values C1a, C2a, C1b, and C2b is expressed by the following expression.

$$C1a < C1b, C2a > C2b$$

Further, when the acceleration G4 is applied to the movable bodies 30a and 30b, the relationship among the electrostatic capacitance values C1a, C2a, C1b, and C2b is expressed by the following expression.

$$C1a > C1b, C2a < C2b$$

Performing subtraction operation on the electrostatic capacitance values C1a, C2a, C1b, and C2b derives the relationship among the electrostatic capacitance values expressed by the following expression.

$$(C1a+C1b)-(C2a+C2b)=0$$

The thus obtained relationships among the electrostatic capacitance values $C1a$, $C2a$, $C1b$, and $C2b$ allow determination of the direction in which acceleration is applied, whereby the acceleration ($G1$, $G2$) can be detected without any influence of the acceleration ($G3$, $G4$).

As described above, the physical quantity sensor 200 can be used as an inertia sensor, such as an acceleration sensor and a gyro sensor. For example, the physical quantity sensor 200 can be used as an electrostatic-capacitance-based acceleration sensor for measuring acceleration in the Z-axis direction.

According to the second embodiment described above, the following advantageous effects are provided.

According to the thus configured physical quantity sensor 200, the first wiring portion 50a, which is connected to the first fixed electrode portion 21a, and the second wiring portion 60a, which is connected to the second fixed electrode portion 22a, are arranged in an asymmetric manner and have substantially the same electric characteristics. The first common line 52a, which is connected to the first wiring portion 50a, and the second common line 62a, which is connected to the second wiring portion 60a, are so provided that they have substantially the same length and are adjacent and parallel to each other with a desired spacing therebetween. As a result, disturbance (such as electrostatic noise) that enters the first common line 52a (electrostatic capacitance value $C1a$) and the disturbance that enters the second common line 62a (electrostatic capacitance value $C2a$) have substantially the same phase and magnitude. Subtracting the output from one of the first wiring portion 50a and the second wiring portion 60a from the output from the other wiring portion allows cancellation of the noise, which causes inaccuracy in detection sensitivity, in the capacitance values for accurate determination of acceleration.

Further, the first wiring portion 50b, which is connected to the first fixed electrode portion 21b, and the second wiring portion 60b, which is connected to the second fixed electrode portion 22b, are arranged in an asymmetric manner and have substantially the same electric characteristics. The first common line 52b (electrostatic capacitance value $C1b$), which is connected to the first wiring portion 50b, and the second common line 62b (electrostatic capacitance value $C2b$), which is connected to the second wiring portion 60b, are so provided that they have substantially the same length and are adjacent and parallel to each other with a desired spacing therebetween. As a result, disturbance (such as electrostatic noise) that enters the first common line 52b and the disturbance that enters the second common line 62b have substantially the same phase and magnitude. Subtracting the output from one of the first wiring portion 50b and the second wiring portion 60b from the output from the other wiring portion allows cancellation of the noise, which causes inaccuracy in detection sensitivity, in the capacitance values for accurate determination of acceleration.

Therefore, configuring the first common line 52a, which is part of the first wiring portion 50a, and the second common line 62a, which is part of the second wiring portion 60a, in such a way that they have substantially the same length and are adjacent and parallel to each other but set apart from each other with a desired gap therebetween and configuring the first common line 52b, which is part of the first wiring portion 50b, and the second common line 62b, which is part of the second wiring portion 60b, in the same manner allow an increase in measurement precision of the physical quantity sensor 200.

The invention is not limited to the embodiments described above, and a variety of changes, improvements, and other modifications can be made to the embodiments described above. A variation will be described below. In the variation, portions different from those in the embodiments described above will be described, and the same constituent portions as those in the embodiments described above have the same reference characters and will not be described redundantly.

Variation

Figure 8:
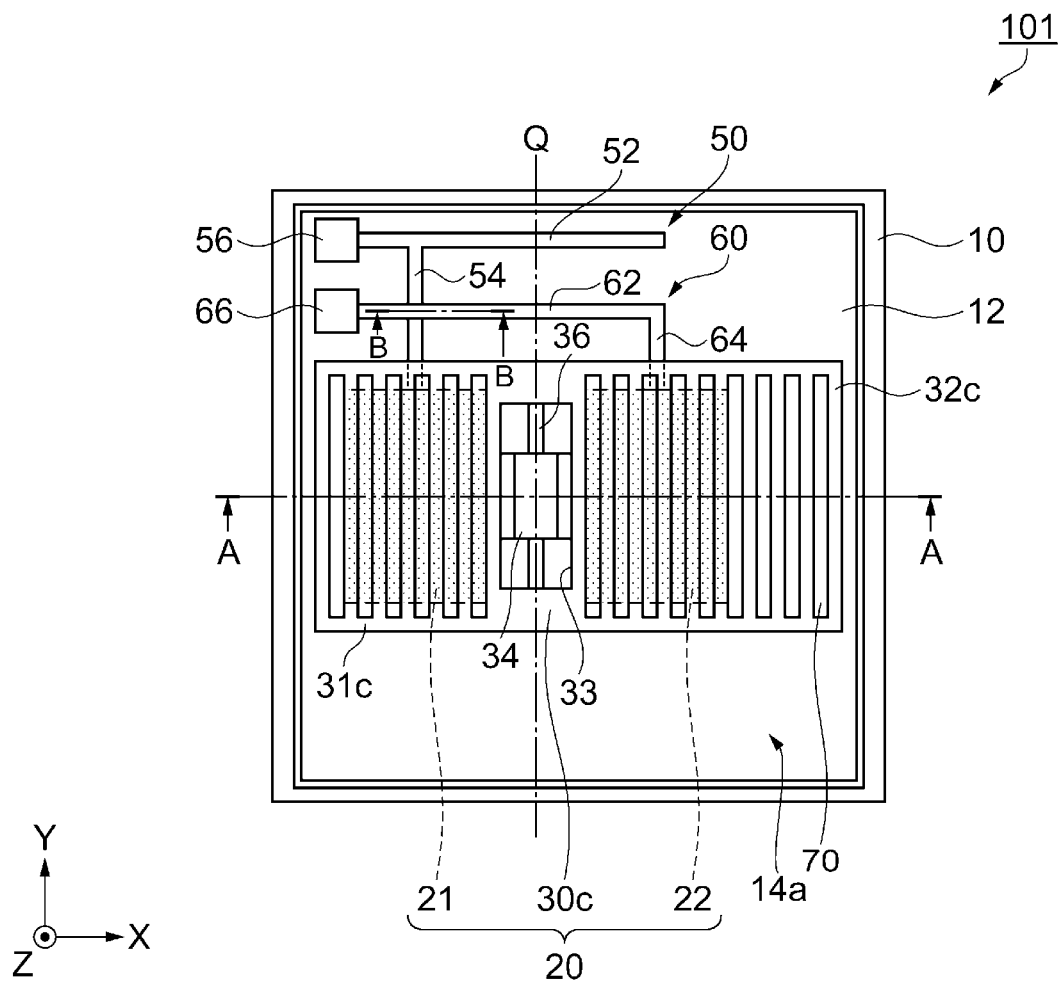
FIG. 8 is a plan view showing the configuration of a variation of the physical quantity sensor according to the first embodiment.

A variation of the physical quantity sensor 100 having been described in the first embodiment will be described below with reference to FIG. 8. FIG. 8 is a plan view showing a physical quantity sensor 101. Three axes shown in FIG. 8, X, Y, and Z axes, are perpendicular to each other. The Z axis indicates the direction in which gravity acts.

The physical quantity sensor 101 according to the variation differs from the physical quantity sensor 100 described above in terms of the shape of the movable body 30, as shown in FIG. 8.

In the present variation, a plurality of slits 70 are formed and arranged in the X direction in a movable region 31c and a movable region 32c of a movable body 30c.

Each of the slits 70 has an elongated rectangular shape the longer sides of which extend in the Y direction of the movable body 30c in a plan view, and the slits 70 pass through the movable body 30c in the thickness direction thereof (direction perpendicular thereto).

According to the physical quantity sensor 101, when it is disposed in an atmospheric environment, for example, and acceleration is applied to the physical quantity sensor 101, the movable body 30c can incline toward the first fixed electrode portion 21 or the second fixed electrode portion 22, as in the first embodiment. In this process, allowing the air to pass through the slits 70 can reduce the degree of influence of air resistance on the movable body 30c.

According to the variation described above, the following advantageous effect is provided.

According to the physical quantity sensor 101, providing the movable body 30c with the slits 70 can reduce the degree of influence of air resistance on the movable body 30c when acceleration is applied to the physical quantity sensor 101 and inclines the movable body 30c, whereby smooth inclination of the movable body 30c is achieved.

Providing the movable body 30c with a plurality of slits 70 therefore allows an increase in measurement precision of the physical quantity sensor 101.

EXAMPLES

Examples in which the physical quantity sensor 100 according to one of the embodiments of the invention is used will be described with reference to FIGS. 9A to 9C.

Figure 9A:
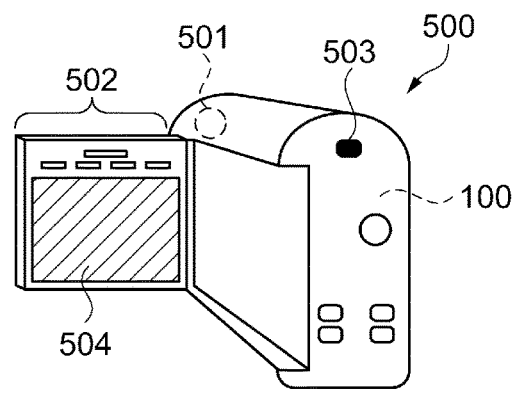
FIG. 9A is a perspective view showing a video camcorder as an electronic apparatus in which a physical quantity sensor is incorporated.

FIG. 9A is a perspective view showing a video camcorder as an electronic apparatus in which the physical quantity sensor 100 is incorporated. FIG. 9B is a perspective view showing a mobile phone as an electronic apparatus in which the physical quantity sensor 100 is incorporated. FIG. 9C is a perspective view showing an automobile as a moving object in which the physical quantity sensor 100 is incorporated.

Electronic Apparatus

Figure 9B:
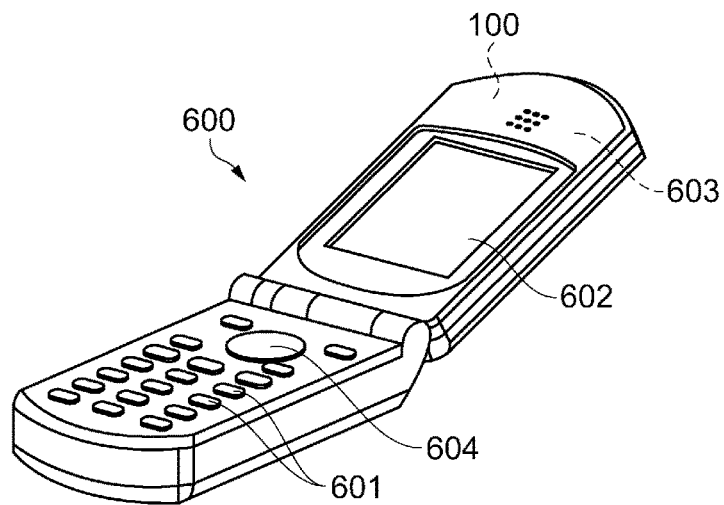
FIG. 9B is a perspective view showing a mobile phone as an electronic apparatus in which a physical quantity sensor is incorporated.
Figure 9C:
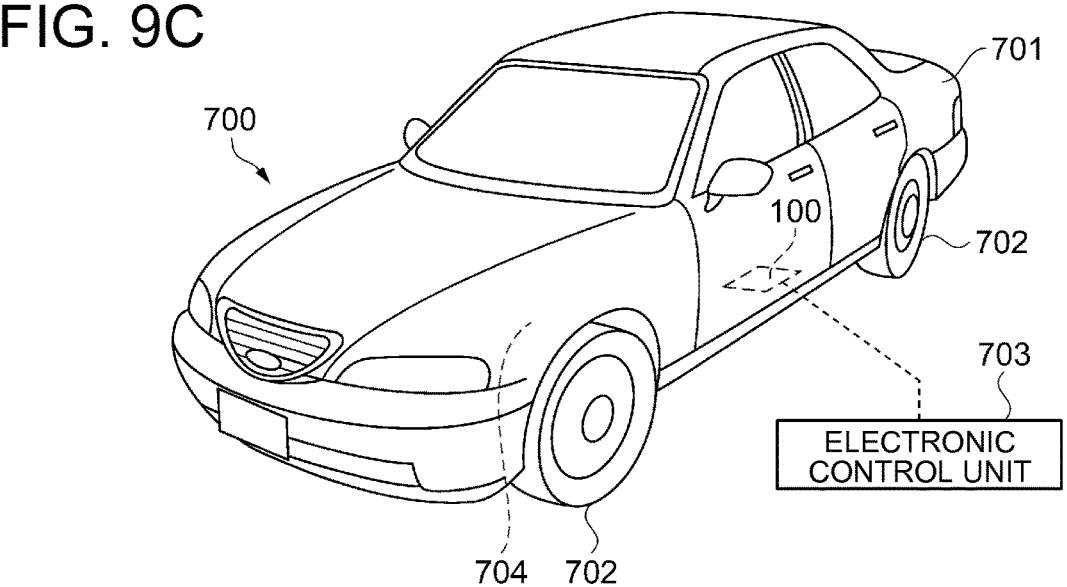
FIG. 9C is a perspective view showing an automobile as a moving object in which a physical quantity sensor is incorporated.

A video camcorder 500 and a mobile phone 600 as electronic apparatus have the physical quantity sensor 100 according to one of the embodiments of the invention incorporated therein, as shown in FIGS. 9A and 9B.

The video camcorder 500 shown in FIG. 9A has an image capture section 501, an operation section 502, an audio input section 503, and a display unit 504 incorporated therein. The video camcorder 500 also has the physical quantity sensor 100 incorporated therein, the number of which is, for example, three, and can therefore provide a function of detecting acceleration, inclination, or any other physical quantity in the three directions, the X, Y, and Z axes (not shown), for example, for hand-shake correction. The video camcorder 500 can therefore record sharp motion video images.

The mobile phone 600 shown in FIG. 9B has a plurality of operation buttons 601, a display unit 602, a camera mechanism 603, and a shutter button 604 incorporated therein and functions as a telephone transceiver and a camera. The mobile phone 600 also has the physical quantity sensor 100 incorporated therein, the number of which is, for example, three, and can therefore provide a function of detecting acceleration, inclination, or any other physical quantity in the three directions, the X, Y, and Z axes (not shown), for example, for hand-shake correction associated with the camera mechanism 603. The mobile phone 600 can therefore record sharp images through the camera mechanism 603.

The physical quantity sensor 100 according to one of the embodiments of the invention can be used not only in the video camcorder shown in FIG. 9A and the mobile phone shown in FIG. 9B but also, for example, in a personal computer (mobile personal computer), a digital still camera, an inkjet-type liquid ejection apparatus (inkjet printer, for example), a television receiver, a video recorder, a car navigation system, a pager, an electronic notebook (including electronic notebook having communication capability), an electronic dictionary, a desktop calculator, an electronic game console, a word processor, a workstation, a TV phone, a security television monitor, electronic binoculars, a POS terminal, medical apparatus (such as electronic thermometer, blood pressure gauge, blood sugar meter, electrocardiograph, ultrasonic diagnostic apparatus, and electronic endoscope), a fish finder, a variety of measuring apparatus, a variety of instruments (such as instruments in vehicles, airplanes, and ships), a flight simulator, and other electronic apparatus.

Moving Object

A moving object using the physical quantity sensor 100 will next be described. A moving object 700 is an automobile and has the physical quantity sensor 100 incorporated therein, as shown in FIG. 9C.

In the moving object 700, the physical quantity sensor 100 is built in an electronic control unit (ECU) 703, which is incorporated in a vehicle body 701. The electronic control unit 703, in which the physical quantity sensor 100 serves, for example, as an acceleration sensor or an inclination sensor to detect the state of the vehicle body 701, can recognize the attitude of the moving object 700, conditions under which the moving object 700 travels, and other factors and appropriately control a suspension 704, wheels 702, and other components of the moving object 700. As a result, the moving object 700 can travel in a safe, stable manner.

In addition to the electronic apparatus and the moving object described above, the physical quantity sensor 100 can be incorporated in a keyless entry system, an immobilizer, a car navigation system, a car air conditioner, an antilock brake system (ABS), an airbag, a tire pressure monitoring system (TPMS), an engine control system, an apparatus that monitors a battery in a hybrid automobile and an electric automobile, a vehicle body attitude control system, and other electronic control units. The physical quantity sensor 100 can thus be used in a wide range of fields.

What is claimed is:

1. A functional device comprising:
   a fixed electrode portion including a first fixed electrode portion and a second fixed electrode portion;
   a first wiring portion connected to the first fixed electrode portion; and
   a second wiring portion connected to the second fixed electrode portion,
   wherein at least one of the first wiring portion and the second wiring portion is provided with a branch portion,
   one wiring line extending from the branch portion is connected to the fixed electrode portion,
   another wiring line extending from the branch portion is provided along the first wiring portion or the second wiring portion,
   each of the first wiring portion and the second wiring portion has a portion which intersects with each of the other's portion, and
   at the portion which intersects with each of the other's portion, the first wiring portion is provided in a groove provided in a substrate, and the second wiring portion extends over the groove and intersects the groove.

2. The functional device according to claim 1,
   wherein each of the first wiring portion and the second wiring portion has a portion extending in parallel to a first direction, and
   the portion of the first wiring portion that extends in the first direction and the portion of the second wiring portion that extends in the first direction have the same length.

3. The functional device according to claim 1,
   further comprising a movable body including a movable electrode portion,
   wherein the fixed electrode portion is disposed and faces the movable electrode portion.

4. The functional device according to claim 1,
   wherein at the portions that intersect each other, an insulating member is provided between the first wiring portion and the second wiring portion.

5. An electronic apparatus in which the functional device according to claim 1 is incorporated.

6. A moving object in which the functional device according to claim 1 is incorporated.

7. The functional device according to claim 2,
   further comprising a movable body including a movable electrode portion,
   wherein the fixed electrode portion is disposed and faces the movable electrode.

8. The functional device according to claim 2,
   wherein a portion of one of the first wiring portion and the second wiring portion intersects a portion of the other one of the first wiring portion and the second wiring portion.

9. The functional device according to claim 3,
   wherein a plurality of pairs of the movable body and the fixed electrode portion is provided.

10. The functional device according to claim 3,
    wherein a portion of one of the first wiring portion and the second wiring portion intersects a portion of the other one of the first wiring portion and the second wiring portion.

11. The functional device according to claim 7,
wherein the movable body and the fixed electrode portion, which is paired with the movable body, are provided at a plurality of locations.

12. The functional device according to claim 9,
wherein a portion one of the first wiring portion and the second wiring portion intersects a portion of the other one of the first wiring portion and the second wiring portion.

* * * * *